United States Patent
Baker et al.

(10) Patent No.: US 11,434,965 B2
(45) Date of Patent: Sep. 6, 2022

(54) ENERGY BASED COMPONENT WEAR MODEL FOR CLUTCH CONTROL OFFSETS IN AN AUTOMATIC TRANSMISSION

(71) Applicants: Dean Baker, Troy, MI (US); Brian P Young, Grand Blanc, MI (US); Nathan J Saliga, Clarkston, MI (US)

(72) Inventors: Dean Baker, Troy, MI (US); Brian P Young, Grand Blanc, MI (US); Nathan J Saliga, Clarkston, MI (US)

(73) Assignee: FCA US LLC, Auburn Hills, MI (US)

( * ) Notice: Subject to any disclaimer, the term of this patent is extended or adjusted under 35 U.S.C. 154(b) by 546 days.

(21) Appl. No.: 16/511,543

(22) Filed: Jul. 15, 2019

(65) Prior Publication Data

US 2021/0018056 A1  Jan. 21, 2021

(51) Int. Cl.
*F16D 66/02* (2006.01)
*F16D 48/06* (2006.01)

(52) U.S. Cl.
CPC .......... *F16D 66/026* (2013.01); *F16D 48/06* (2013.01)

(58) Field of Classification Search
CPC ............................. F16D 66/026; F16D 48/06
See application file for complete search history.

(56) References Cited

U.S. PATENT DOCUMENTS

| | | |
|---|---|---|
| 5,238,093 A | 8/1993 | Campbell |
| 5,908,097 A | 6/1999 | Grosspietsch et al. |
| 6,040,768 A | 3/2000 | Drexl |
| 8,651,256 B2 | 2/2014 | Bitzer |
| 2009/0111642 A1* | 4/2009 | Sah ............ B60K 6/445 477/5 |
| 2011/0024258 A1* | 2/2011 | Avny ............ F16D 13/72 192/111.12 |
| 2012/0016561 A1* | 1/2012 | Pinte ............ F16D 48/066 701/68 |
| 2014/0005000 A1* | 1/2014 | Reibold ............ F16D 48/00 477/174 |
| 2015/0226274 A1* | 8/2015 | Pritchard ............ F16D 48/06 192/70.252 |
| 2016/0377131 A1* | 12/2016 | Ziefle ............ F16D 48/064 701/22 |
| 2017/0193143 A1* | 7/2017 | Saha ............ G06F 11/004 |
| 2018/0023646 A1* | 1/2018 | Beck ............ F16D 65/567 188/71.7 |
| 2019/0032732 A1* | 1/2019 | Daavettila ............ F16D 48/02 |

FOREIGN PATENT DOCUMENTS

| | | |
|---|---|---|
| DE | 102013210357 A1 | 12/2014 |
| WO | 2008151923 A1 | 12/2008 |

* cited by examiner

*Primary Examiner* — Colby M Hansen
(74) *Attorney, Agent, or Firm* — Ralph E. Smith

(57) ABSTRACT

An automatic transmission system of a vehicle and a corresponding adaptation method utilize an automatic transmission comprising a hydraulic friction clutch and a controller configured to continuously perform a feedforward adaptation procedure that models wear of the clutch, the feedforward adaptation procedure comprising obtaining a set of operating parameters each indicative of wear of the clutch, model the wear of the clutch based on the set of operating parameters using a clutch wear model, and determine a clutch offset for controlling application of the clutch based on the modeled clutch wear, and control application of the clutch based on the determined clutch offset.

20 Claims, 3 Drawing Sheets

ENERGY BASED COMPONENT WEAR MODEL FOR CLUTCH CONTROL OFFSETS IN AN AUTOMATIC TRANSMISSION

FIELD

The present application generally relates to vehicle automatic transmissions and, more particularly, to an energy based component wear model for clutch control offsets in such automatic transmissions.

BACKGROUND

In an automatic transmission of a vehicle, one particular type of clutch utilized is a hydraulic friction clutch. A hydraulic friction clutch comprises an apply plate coupled to an input shaft and a reaction plate coupled to an output shaft. When the clutch is engaged, a hydraulic piston forces the apply plate into contact with the reaction plate via a clutch disc having frictional material on both sides, and the friction causes torque to be transferred from the input shaft to the output shaft. When the clutch is disengaged, the hydraulic piston is retracted and a clutch spring causes the apply plate and the reaction plate to separate. Over time, components of the clutch, such as its friction materials, the clutch spring, and hydraulic clutch seals, experience wear. If unaccounted for, this clutch wear could potentially result in poor transmission shift quality and/or a reduced life of the transmission. Accordingly, while such automatic transmission systems do work well for their intended purpose, there remains a need for improvement in the relevant art.

SUMMARY

According to one example aspect of the invention, an automatic transmission system of a vehicle is presented. In one exemplary implementation, the system comprises: an automatic transmission comprising a hydraulic friction clutch a controller configured to: continuously perform a feedforward adaptation procedure that models wear of the clutch, the feedforward adaptation procedure comprising: obtaining a set of operating parameters each indicative of wear of the clutch, model the wear of the clutch based on the set of operating parameters using a clutch wear model, and determine a clutch offset for controlling application of the clutch based on the modeled clutch wear, and then control application of the clutch based on the determined clutch offset.

In some implementations, the determined clutch offset is a time offset for a time to apply the clutch. In some implementations, the determined clutch offset is a pressure offset for a pressure to be applied to the clutch. In some implementations, the modeled clutch wear comprises at least one of a modeled clutch seal wear, a modeled clutch frictional material wear, and a clutch spring wear. In some implementations, at least some of the set of operating parameters are indicative of an energy being input into the clutch.

In some implementations, the set of operating parameters comprises at least one of clutch temperature, clutch slip speed, clutch friction material friction, clutch apply pressure, clutch spring compression time, and clutch torque transfer. In some implementations, the set of operating parameters comprises clutch temperature, clutch slip speed, clutch friction material friction, clutch apply pressure, clutch spring compression time, and clutch torque transfer. In some implementations, the feedforward adaptation procedure is performed more often during an initial break-in period of the vehicle than a subsequent long-term period of the vehicle.

In some implementations, the feedforward adaptation procedure does not require a specific set of vehicle driving conditions in order to be performed. In some implementations, the automatic transmission comprises a plurality of clutches and the controller is configured to continuously perform the feedforward adaptation procedure to model wear of each of the plurality of clutches, to determine a plurality of clutch offsets for the plurality of clutches, respectively, and to control application of the plurality of clutches based on the plurality of clutch offsets, respectively.

According to another example aspect of the invention, a continuous feedforward adaptation method for modeling wear of and for subsequently controlling application of a hydraulic friction clutch of an automatic transmission of a vehicle is presented. In one exemplary implementation, the method comprises: obtaining, by a controller of the vehicle, a set of operating parameters each indicative of the wear of the clutch, modeling, by the controller, the wear of the clutch using a clutch wear model and the set of operating parameters, determining, by the controller, a clutch offset for controlling application of the clutch based on the modeled clutch wear, and controlling, by the controller, application of the clutch based on the determined clutch offset.

In some implementations, the determined clutch offset is a time offset for a time to apply the clutch. In some implementations, the determined clutch offset is a pressure offset for a pressure to be applied to the clutch. In some implementations, the modeled clutch wear comprises at least one of a modeled clutch seal wear, a modeled clutch frictional material wear, and a clutch spring wear. In some implementations, at least some of the set of operating parameters are indicative of an energy being input into the clutch.

In some implementations, the set of operating parameters comprises at least one of clutch temperature, clutch slip speed, clutch friction material friction, clutch apply pressure, clutch spring compression time, and clutch torque transfer. In some implementations, the set of operating parameters comprises clutch temperature, clutch slip speed, clutch friction material friction, clutch apply pressure, clutch spring compression time, and clutch torque transfer.

In some implementations, the feedforward adaptation procedure is performed more often during an initial break-in period of the vehicle than a subsequent long-term period of the vehicle. In some implementations, the feedforward adaptation procedure does not require a specific set of vehicle driving conditions in order to be performed. In some implementations, the automatic transmission comprises a plurality of clutches and the method comprises continuously performing the feedforward adaptation procedure to model wear of each of the plurality of clutches, determining a plurality of clutch offsets for the plurality of clutches, respectively, and controlling application of the plurality of clutches based on the plurality of clutch offsets, respectively.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do

DESCRIPTION

As previously discussed, there remains a need for automatic transmission systems that are capable of determining clutch wear and adjusting clutch control accordingly. Conventional solutions perform periodic clutch wear estimations only at predetermined times or during specific vehicle driving conditions. The predetermined times could include, for example, end of line estimations (e.g., at the vehicle assembly plant) and during dealer servicing using a special tool. The specific vehicle driving conditions could include, for example, an extended period where the vehicle stays in a particular speed, load, and gear window, during which engagement points of particular clutches are able to be tested. These specific vehicle driving conditions, however, may not occur that often, such as only once every thousand miles driven by the vehicle. Shift time could be monitored and utilized to determine whether significant clutch wear has occurred and has not been accounted for, e.g., because the specific vehicle driving conditions have not occurred. In between these periodic clutch wear estimations, there is additional clutch wear occurring, which could negatively affect transmission shift quality and/or could decrease the life of the transmission.

In addition to potentially occurring very infrequently, the above-described conventional solutions are also all reactive. In other words, these solutions require specific vehicle driving conditions or a detected shift quality problem before clutch control adaptation is performed. Accordingly, feedforward adaptation techniques for modeling wear of and subsequently controlling a clutch of an automatic transmission are presented. As these techniques are feedforward, they are predictive rather than reactive and thus are able to perform clutch control adaptation before a shift quality issue or other potential malfunction ever occurs. These techniques utilize a clutch wear model that models wear of the clutch and its various components (hydraulic fluid seals, friction materials, clutch spring, etc.) based on various parameters relating to actuation quantity/duration of the clutch and the input energy being provided to the clutch. Nonlimiting examples of these parameters include clutch temperature, clutch slip speed, clutch friction material friction, clutch apply pressure, clutch torque transfer, and it will be appreciated that fewer or additional parameters could be utilized as clutch wear model inputs.

Figure 1:
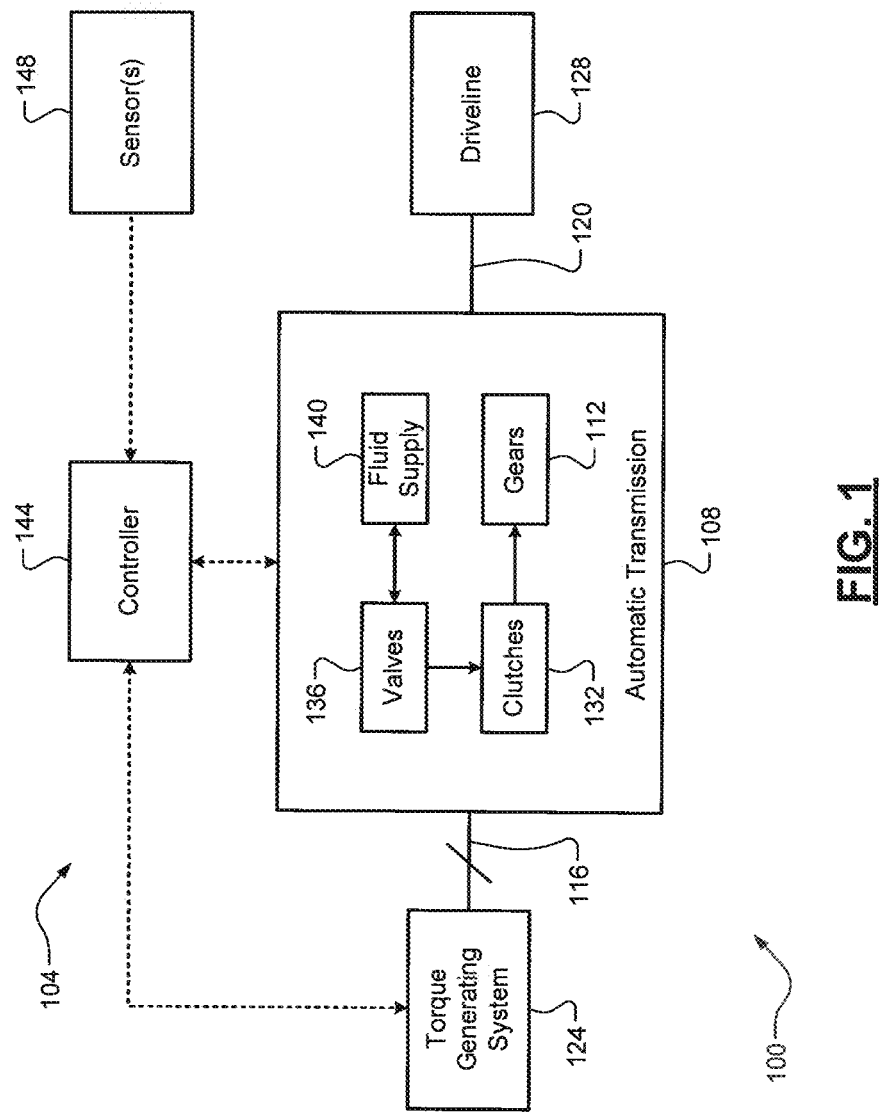
FIG. 1 is a functional block diagram of a vehicle having an example automatic transmission system comprising an automatic transmission and a controller according to the principles of the present disclosure.

Referring now to FIG. 1, a functional block diagram of an example vehicle 100 having an automatic transmission system 104 is illustrated. The automatic transmission system 104 comprises an automatic transmission 108 configured to transfer drive torque via one or more planetary gear sets 112 configured to achieve a particular gear ratio. The gear ratio specifies a ratio of rotation of an input shaft 116 of the transmission 108 to an output shaft 120 of the transmission 108. The input shaft 116 is selectively coupled to a torque generating system 124 of the vehicle (e.g., an engine, an electric motor, or a combination thereof) that is configured to generate drive torque for vehicle propulsion. The output shaft 120 is coupled to a driveline 128 of the vehicle 100. In the transmission 108, a plurality of clutches 132 are selective engaged and disengaged to manipulate the planetary gear set(s) 112 to achieve a desired gear ratio. Hydraulic fluid pressure for engaging and disengaging the clutches 132 is provided via flow control valves 136 and a hydraulic fluid supply system 140.

A controller 144 controls operation of the vehicle 100, including controlling the torque generating system 124 to achieve a desired amount of drive torque (e.g., in response to a driver torque request) and controlling shifting of the transmission 108. The automatic transmission system 104 generally comprises the automatic transmission 108 and the controller 144, but it will be appreciated that there could be other non-illustrated components (e.g., an external hydraulic fluid supply system). The controller 144 receives inputs from a set of one or more sensor(s) 148, which monitor, among other things, a set of parameters indicative of clutch wear. The controller 144 is configured to implement at least a portion of the techniques of the present disclosure, including using these monitored parameters, other known parameters, and a clutch wear model to perform a feedforward adaptation procedure by which clutch wear is modeled and then utilized to determine clutch offsets (clutch engagement time, clutch apply pressure, etc.) for improved clutch control to provide improved shift quality and/or to extend a life of the transmission 108.

Figure 2:
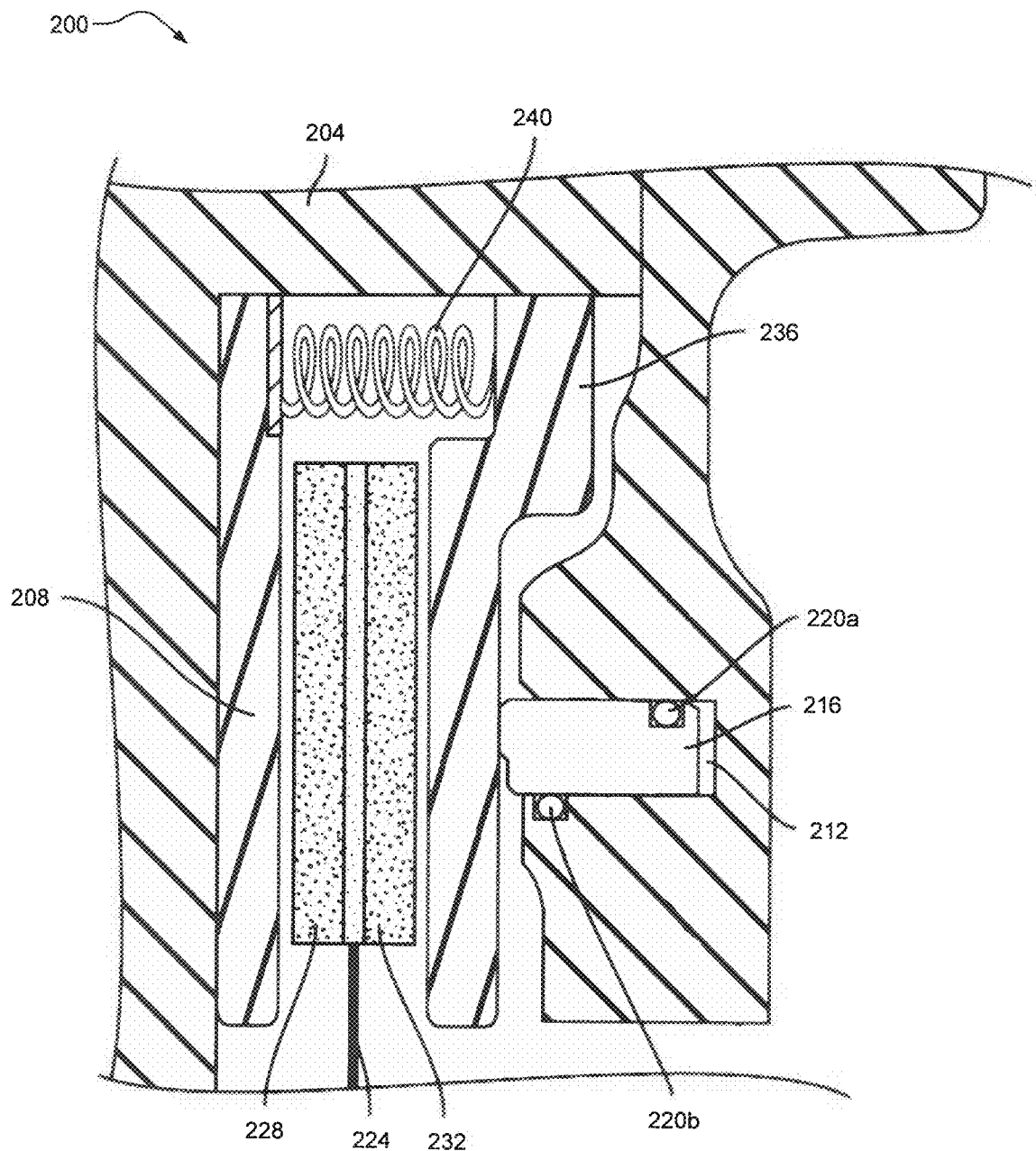
FIG. 2 is a schematic diagram of an example configuration of a clutch of the automatic transmission of FIG. 1 according to the principles of the present disclosure.

Referring now to FIG. 2, a schematic diagram of an example configuration of a clutch 132 of the automatic transmission 108 (hereinafter, "clutch 200") is illustrated. It will be appreciated that the illustrated clutch 200 is merely one exemplary implementation and the techniques of the present disclosure are applicable to any hydraulic friction clutch. The clutch 200 comprises a housing 204 that houses the various components of the clutch 200. Specifically, the clutch comprises a reaction plate 208 that is fixedly attached to the clutch housing 200 and is also coupled to an output shaft, such as the output shaft 120 of the transmission 108 or another intermediate shaft of the transmission 108. The clutch housing 204 also defines a cavity 212 having a piston 216 inserted therein. The cavity 212 is variably filled with a hydraulic fluid (e.g., from fluid supply 140 via valves 136) to cause the piston 216 to move into and out of the cavity 212. A pair of seals 220a, 220b (hereinafter, "seals 220") located in the housing 204 form a barrier to prevent the hydraulic fluid from escaping out of the cavity 212. It will be appreciated that there could be different quantities of and/or quantities of the seals 220.

The clutch 200 further comprises a clutch disk 224 having friction materials or surfaces 228, 232 mounted on both sides of a portion of its surface. The friction material 228 on a first side of the clutch disk 224 is parallel to the reaction plate 208. The friction material 232 on an opposing side of the clutch disk 224 is parallel to an apply plate 236 of the clutch 200, which is coupled to an input shaft, such as an output shaft of the torque generating system 124 or another intermediate shaft of the transmission 108. The apply plate 236 is slidably mounted within the clutch housing 204 and is contacted by the piston 216. Extension of the piston 216 out of the cavity 212 causes the apply plate 236 to move towards the reaction plate 208, thereby squeezing the clutch disk 224 and friction materials 228, 232 between the apply plate 236 and reaction plate 208. A clutch or return spring 240 configured between the apply plate 236 and reaction plate 208 moves the apply plate 236 away from the reaction plate 208, clutch disk 224, and friction materials 228, 232 when the piston 216 is retracted into the cavity 212 due to a lack of hydraulic fluid pressure. To engage apply the clutch 200 from a disengaged state, the hydraulic fluid pressure in the cavity 212 is increased, thereby causing the piston 216 to move outward from the cavity 212 and towards the reaction plate 208.

As described above, as the piston 216 presses against the apply plate 236, it causes the apply plate 236 to move towards the reaction plate 208. After a certain distance of travel, the apply plate 236 contacts the friction material 232 of the clutch disk 224 and causes the friction material 228 to contact the reaction plate 208 (also known as a "kiss point"). Similarly, to disengage the clutch 200 from an engaged state, the hydraulic fluid pressure in the cavity 212 is decreased below a threshold, thereby causing the piston 216 to move inward to the cavity 212 and away from the reaction plate 208. As the various clutch components wear over time, the kiss point and other engagement points (e.g., full engagement) of the clutch 200 could change. For example, as the friction materials 228, 232 wear, the piston 216 may need to be moved further (e.g., at a higher hydraulic pressure) in order to achieve the kiss point due to decreased friction or frictional material loss. The seals 220, for example, could wear overtime, thereby affecting the generation of hydraulic fluid pressure in the cavity 212. In yet another example, the clutch spring 240 could wear overtime, which could affect its spring force and thus the amount of force required by the piston 216 to overcome the spring force for clutch application.

The clutch wear model takes into account known parameters for these various components (type/thickness of friction materials 228, 232, original spring constant or force of clutch spring 240, hydraulic fluid pressure in cavity 212 when the seals 220 are new, etc.) and then monitors the clutch 200 over time to model wear of these various components and in turn determine clutch offsets for proper control of the clutch 200. The manner in which the clutch 200 is actuated over time can also affect the wear of these various components differently. For example only, the number of times the clutch 200 is actuated could have a different effect on the clutch spring 240 and the seals 220 (e.g., a greater effect) compared to the effect on the friction materials 228, 232. Similarly, for example only, the average amount of energy being input to the clutch 200 per actuation over a period could have a different effect on the friction materials 228, 232 (e.g., a greater effect) compared to the effect on the clutch spring 240 and the seals 220.

Figure 3:
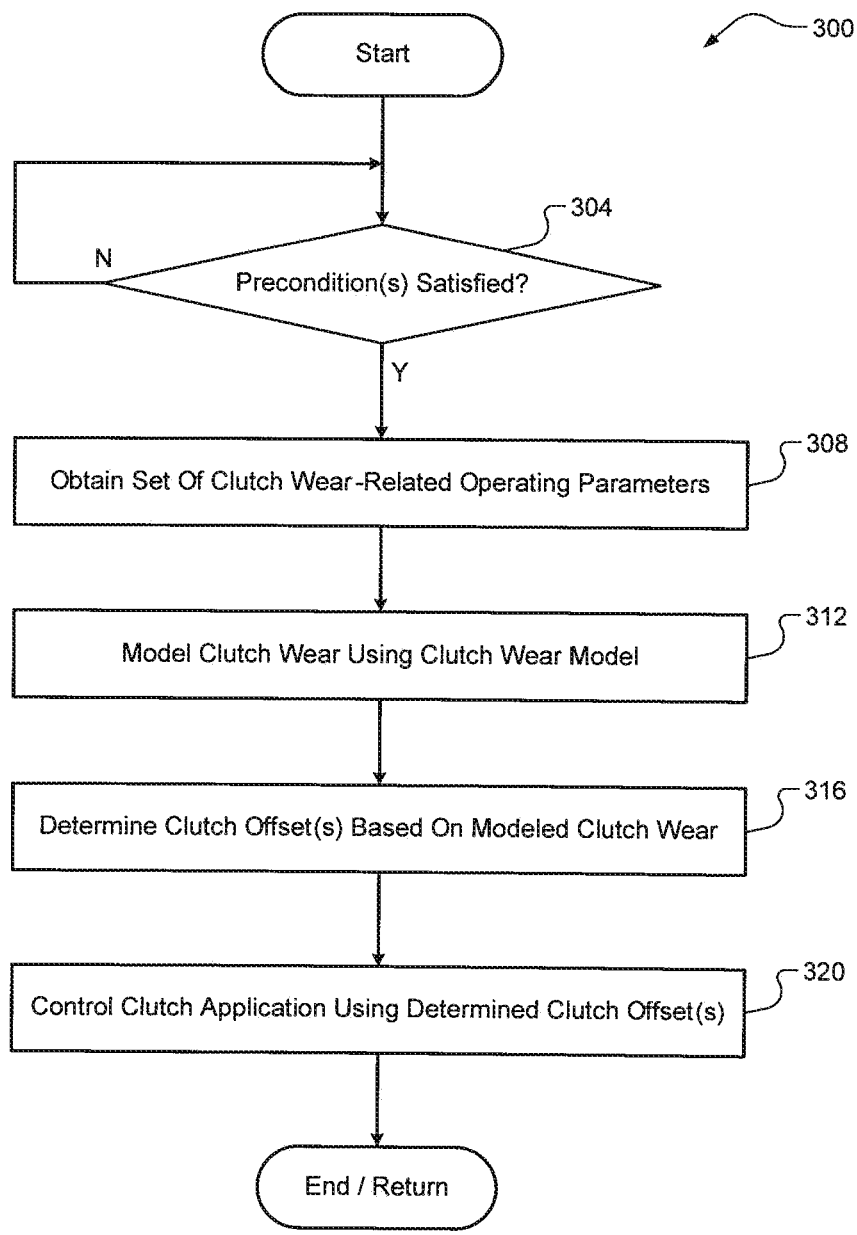
FIG. 3 is a flow diagram of an example feedforward adaptation method for modeling wear of and subsequently controlling application of a clutch of an automatic transmission of a vehicle according to the principles of the present disclosure.

Referring now to FIG. 3, a flow diagram of an example feedforward adaptation method 300 for modeling wear of and subsequently controlling engagement of the clutch 200 (or clutch 132) of the automatic transmission 108 of the vehicle 100 is illustrated. At 304, the controller 144 determines whether a set of one or more optional preconditions have been satisfied. These preconditions could include, for example only, the torque generating system 124 (e.g., an engine) is currently running and there are no potential vehicle malfunctions present that would otherwise preclude the feedforward adaptation procedure of the present disclosure. When satisfied, the method 300 proceeds to 308. Otherwise, the method 300 ends or returns to 304. At 308, the controller 144 obtains the set of operating parameters each indicative of the wear of the clutch 200 (e.g. from sensor(s) 148). At 312, the controller 144 models the wear of the clutch 200 using a clutch wear model and the set of operating parameters. At 316, the controller 144 determines a clutch offset for controlling application of the clutch 200 based on the modeled clutch wear. At 320, the controller 144 controls application of the clutch 200 based on the determined clutch offset.

The method 300 then ends or returns to 304 for one or more additional cycles. It will be appreciated that the method 300 could continuously run (e.g., provided the precondition(s) are satisfied) or could periodically run at a defined rate (e.g., once every X seconds/minutes/hours). It will also be appreciated that during a break-in period (i.e., when the vehicle 100 and the transmission 108 are relatively new, such as for a first X miles), the method 300 could run more frequently because larger adaptations are occurring, as opposed to a long-term or later life of the vehicle 100 and the transmission 108 where less severe adaptations are likely occurring and thus the method 300 could be run less frequently compared to the break-in period). It will also be appreciated that the method 300 could run at the same rate during both the break-in and long-term periods. It will also be appreciated that the method 300 could be periodically audited to verify its accuracy and to remove any model error if necessary. These period audits could be, for example, the conventional adaptations previously described herein (end-of-line vehicle build, dealer servicing, pulse adaptations during specific vehicle driving conditions, etc.).

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. An automatic transmission system for a vehicle, the system comprising:

an automatic transmission comprising a hydraulic friction clutch including a housing having therein a set of seals, a clutch disc defining first and second opposing sides each having frictional materials mounted thereon, a reaction plate parallel to a first side of the clutch disc, an apply plate parallel to the second side of the clutch disc, a clutch spring disposed between the reaction and apply plates, and a piston moveable in/out of a cavity defined by the housing in response to hydraulic fluid pressure sealed therein; and a controller configured to:

continuously perform a feedforward adaptation procedure that models wear of the clutch, the feedforward adaptation procedure including:

obtaining a set of operating parameters each indicative of wear of the clutch, modeling the wear of the clutch based on the set of operating parameters using a clutch wear model, wherein the modeled clutch wear comprises at least one of a modeled clutch seal wear, a modeled clutch frictional material wear, and a modeled clutch spring wear, and determining a clutch offset for controlling application of the clutch based on the modeled clutch wear; and control application of the clutch based on the determined clutch offset.

2. The system of claim 1, wherein the determined clutch offset is a time offset for a time to apply the clutch.

3. The system of claim 1, wherein the determined clutch offset is a pressure offset for a pressure to be applied to the clutch.

4. The system of claim 1, wherein the modeled clutch wear comprises the modeled clutch seal wear, the modeled clutch frictional material wear, and the modeled clutch spring wear.

5. The system of claim 4, wherein at least some of the set of operating parameters are indicative of an energy being input into the clutch.

6. The system of claim 5, wherein the set of operating parameters comprises at least one of clutch temperature, clutch slip speed, clutch friction material friction, clutch apply pressure, clutch spring compression time, and clutch torque transfer.

7. The system of claim 5, wherein the set of operating parameters comprises clutch temperature, clutch slip speed, clutch friction material friction, clutch apply pressure, clutch spring compression time, and clutch torque transfer.

8. The system of claim 1, wherein the feedforward adaptation procedure is performed more often during an initial break-in period of the vehicle than a subsequent long-term period of the vehicle.

9. The system of claim 1, wherein the feedforward adaptation procedure does not require a specific set of vehicle driving conditions in order to be performed.

10. The system of claim 1, wherein the automatic transmission comprises a plurality of clutches and the controller is configured to continuously perform the feedforward adaptation procedure to model wear of each of the plurality of clutches, to determine a plurality of clutch offsets for the plurality of clutches, respectively, and to control application of the plurality of clutches based on the plurality of clutch offsets, respectively.

11. A continuous feedforward adaptation method for modeling wear of and for subsequently controlling application of a hydraulic friction clutch of an automatic transmission of a vehicle, the method comprising:

obtaining, by a controller of the vehicle, a set of operating parameters each indicative of the wear of the clutch, the clutch including a housing having therein a set of seals, a clutch disc defining first and second opposing sides each having frictional materials mounted thereon, a reaction plate parallel to a first side of the clutch disc, an apply plate parallel to the second side of the clutch disc, a clutch spring disposed between the reaction and apply plates, and a piston moveable in/out of a cavity defined by the housing in response to hydraulic fluid pressure sealed therein;

modeling, by the controller, the wear of the clutch using a clutch wear model and the set of operating parameters, wherein the modeled clutch wear comprises at least one of a modeled clutch seal wear, a modeled clutch frictional material wear, and a modeled clutch spring wear;

determining, by the controller, a clutch offset for controlling application of the clutch based on the modeled clutch wear; and controlling, by the controller, application of the clutch based on the determined clutch offset.

12. The method of claim 11, wherein the determined clutch offset is a time offset for a time to apply the clutch.

13. The method of claim 11, wherein the determined clutch offset is a pressure offset for a pressure to be applied to the clutch.

14. The method of claim 11, wherein the modeled clutch wear comprises the modeled clutch seal wear, the modeled clutch frictional material wear, and the modeled clutch spring wear.

15. The method of claim 14, wherein at least some of the set of operating parameters are indicative of an energy being input into the clutch.

16. The method of claim 15, wherein the set of operating parameters comprises at least one of clutch temperature, clutch slip speed, clutch friction material friction, clutch apply pressure, clutch spring compression time, and clutch torque transfer.

17. The method of claim 15, wherein the set of operating parameters comprises clutch temperature, clutch slip speed, clutch friction material friction, clutch apply pressure, clutch spring compression time, and clutch torque transfer.

18. The method of claim 11, wherein the feedforward adaptation procedure is performed more often during an initial break-in period of the vehicle than a subsequent long-term period of the vehicle.

19. The method of claim 11, wherein the feedforward adaptation procedure does not require a specific set of vehicle driving conditions in order to be performed.

20. The method of claim 11, wherein the automatic transmission comprises a plurality of clutches and the method comprises continuously performing the feedforward adaptation procedure to model wear of each of the plurality of clutches, determining a plurality of clutch offsets for the plurality of clutches, respectively, and controlling application of the plurality of clutches based on the plurality of clutch offsets, respectively.

* * * * *